United States Patent
Katayama et al.

(10) Patent No.: US 10,416,543 B2
(45) Date of Patent: Sep. 17, 2019

(54) PROJECTION-TYPE IMAGE DISPLAY APPARATUS

(71) Applicant: MAXELL, LTD., Kyoto (JP)

(72) Inventors: Takeshi Katayama, Kyoto (JP); Kazuo Shikita, Kyoto (JP); Akihiro Shiraishi, Kyoto (JP); Tatsuya Ino, Kyoto (JP); Hiroyuki Inoue, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/075,313

(22) PCT Filed: Sep. 23, 2016

(86) PCT No.: PCT/JP2016/077950
§ 371 (c)(1),
(2) Date: Aug. 3, 2018

(87) PCT Pub. No.: WO2017/134855
PCT Pub. Date: Aug. 10, 2017

(65) Prior Publication Data
US 2019/0041731 A1    Feb. 7, 2019

(30) Foreign Application Priority Data
Feb. 5, 2016 (JP) .................................. 2016-020467

(51) Int. Cl.
H04N 9/31    (2006.01)
G03B 21/16  (2006.01)
H04N 5/74    (2006.01)

(52) U.S. Cl.
CPC .............. *G03B 21/16* (2013.01); *H04N 5/74* (2013.01); *H04N 9/31* (2013.01); *H04N 9/3144* (2013.01);
(Continued)

(58) Field of Classification Search
CPC ......... G03B 21/16; H04N 9/3144; H04N 5/74
(Continued)

(56) References Cited

U.S. PATENT DOCUMENTS

2007/0211477 A1    9/2007 Kim
2008/0232100 A1*   9/2008 Lin ........................ G03B 21/20
                                                              362/231
(Continued)

FOREIGN PATENT DOCUMENTS

JP    2009-251370 A    10/2009
JP    2010-197497 A     9/2010
(Continued)

OTHER PUBLICATIONS

International Search Report for WO 2017/134855 A1, dated Dec. 20, 2016.

*Primary Examiner* — Ryan D Howard
(74) *Attorney, Agent, or Firm* — Volpe and Koenig, P.C.

(57) ABSTRACT

In a projection-type image display apparatus configured to project images formed on a display element by using light from a plurality of light sources, the apparatus includes light-source coolers provided to the light sources and configured to cool the light sources, and the light-source coolers are arranged so that light-source heat dissipating directions of all the light-source coolers are substantially the same among the light-source coolers the light-source heat dissipating directions being directed toward heat dissipating parts dissipating the heat of the light sources with reference to heat absorbing parts absorbing the heat of the light sources.

13 Claims, 6 Drawing Sheets

(52) U.S. Cl.
CPC ......... *H04N 9/3164* (2013.01); *H04N 9/3182* (2013.01); *H04N 9/3194* (2013.01)

(58) Field of Classification Search
USPC ............................ 353/57, 58, 60, 61, 52, 54
See application file for complete search history.

(56) References Cited

U.S. PATENT DOCUMENTS

| | | |
|---|---|---|
| 2011/0001937 A1 | 1/2011 | Matsumoto |
| 2013/0258666 A1 | 10/2013 | Sato et al. |
| 2013/0342765 A1 | 12/2013 | Asano |

FOREIGN PATENT DOCUMENTS

| | | |
|---|---|---|
| JP | 2013-206697 A | 10/2013 |
| JP | 2014-006369 A | 1/2014 |
| JP | 2015-141811 A | 8/2015 |
| WO | 2009/110365 A1 | 9/2009 |

\* cited by examiner

PROJECTION-TYPE IMAGE DISPLAY APPARATUS

TECHNICAL FIELD

The present invention relates to a technique of a projection-type image display apparatus, and, more particularly relates to a technique effectively applied to a projection-type image display apparatus configured to project images using a plurality of power sources.

BACKGROUND ART

In a projection-type image display apparatus such as a liquid crystal projector, a white color light source is used as a light source projecting images onto a screen. And, in recent years, a projector provided with light sources of three colors (red, green and blue) has been provided.

For example, Japanese Patent Application Laid-Open Publication No. 2010-197497 (Patent Document 1) discloses a projector provided with light emitting apparatuses corresponding to the respective colors (red, green and blue), the projector making each light emitting apparatus emit light of each color (red, green and blue) by irradiation of a phosphor layer with excitation light, and using white color light formed by synthesizing the light of the respective colors as a light source for projection.

RELATED ART DOCUMENT

Patent Document

Patent Document 1: Japanese Patent Application Laid-open Publication No. 2010-197497

SUMMARY OF THE INVENTION

Problems to be Solved by the Invention

When the projector is used, a large amount of heat is generated from the light source. A performance of the light source is lowered by temperature rise of the light source, and therefore, brightness of a projected image is lowered. Therefore, a cooler for cooling the light source is provided inside the projector.

A cooling ability of the cooler generally changes depending on an orientation of the placed projector. In the white color light source, the change of the cooling ability of the cooler leads to the lowering of the brightness of the image. Further, when the projector is provided with a plurality of light sources, a plurality of coolers are required. In the cooling abilities of the coolers in this case, when cooling states of the respective coolers separately change due to the change of the orientation of the placed projector, balance in a light emitting amount among the light sources deteriorates, and therefore, the colors of the projected image are unbalanced. Under such circumstances, in order to adjust the color balance to be correct in accordance with the light emitting amount of the light source having the worst cooling state, it is required to lower an output of another light source, and therefore, this leads to the lowering of the brightness of the projected image of projector.

Accordingly, an object of the present invention is to provide a projector that can project more suitable images by more suitably cooling a plurality of light sources.

The above and other objects and novel characteristics of the present invention will be apparent from the description and the accompanying drawings of the present specification.

Means for Solving the Problems

The summary of the typical aspects of the inventions disclosed in the present application will be briefly described as follows.

A projection-type image display apparatus according to a typical embodiment of the present invention is a projection-type image display apparatus configured to project images formed on a display element by using light from a plurality of light sources, the projection-type image display apparatus has such a feature as including light-source coolers provided to the plurality of light sources and configured to cool the light sources, respectively, and such a feature as the light-source coolers in all of which light-source heat dissipating directions are substantially the same as one another, the light-source heat dissipating directions being directions toward heat dissipating parts dissipating the heat of the light sources with reference to heat absorbing parts absorbing the heat of the light sources.

Effects of the Invention

The effects obtained by the typical aspects of the invention disclosed in the present application will be briefly described below.

That is, according to the typical embodiment of the present invention, a projector that can project more suitable images by more suitably cooling a plurality of light sources is provided.

BRIEF DESCRIPTIONS OF THE DRAWINGS

FIGS. 2 (a) and (b) are diagrams each schematically showing a specific configuration example related to an internal structure of the projection-type image display apparatus according to one embodiment of the present invention;

FIG. 3 (a) to (d) are perspective views each schematically showing the configuration example related to the internal structure of the projection-type image display apparatus according to one embodiment of the present invention, as viewed from each direction;

FIGS. 4 (a) and (b) are diagrams each showing an outline related to a configuration example of a projection-type image display apparatus according to one embodiment of the present invention;

FIG. 5 (a) to (d) are perspective views each schematically showing a configuration example related to an internal structure of the projection-type image display apparatus according to one embodiment of the present invention, as viewed from each direction.

BEST MODE FOR CARRYING OUT THE INVENTION

Hereinafter, embodiments of the present invention will be described in detail on the basis of the accompanying drawings. Note that the same components are denoted by the same reference symbols in principle throughout all the drawings for describing the embodiments, and the repetitive description thereof will be omitted.

First Embodiment

<Apparatus Configuration>

Figure 1:
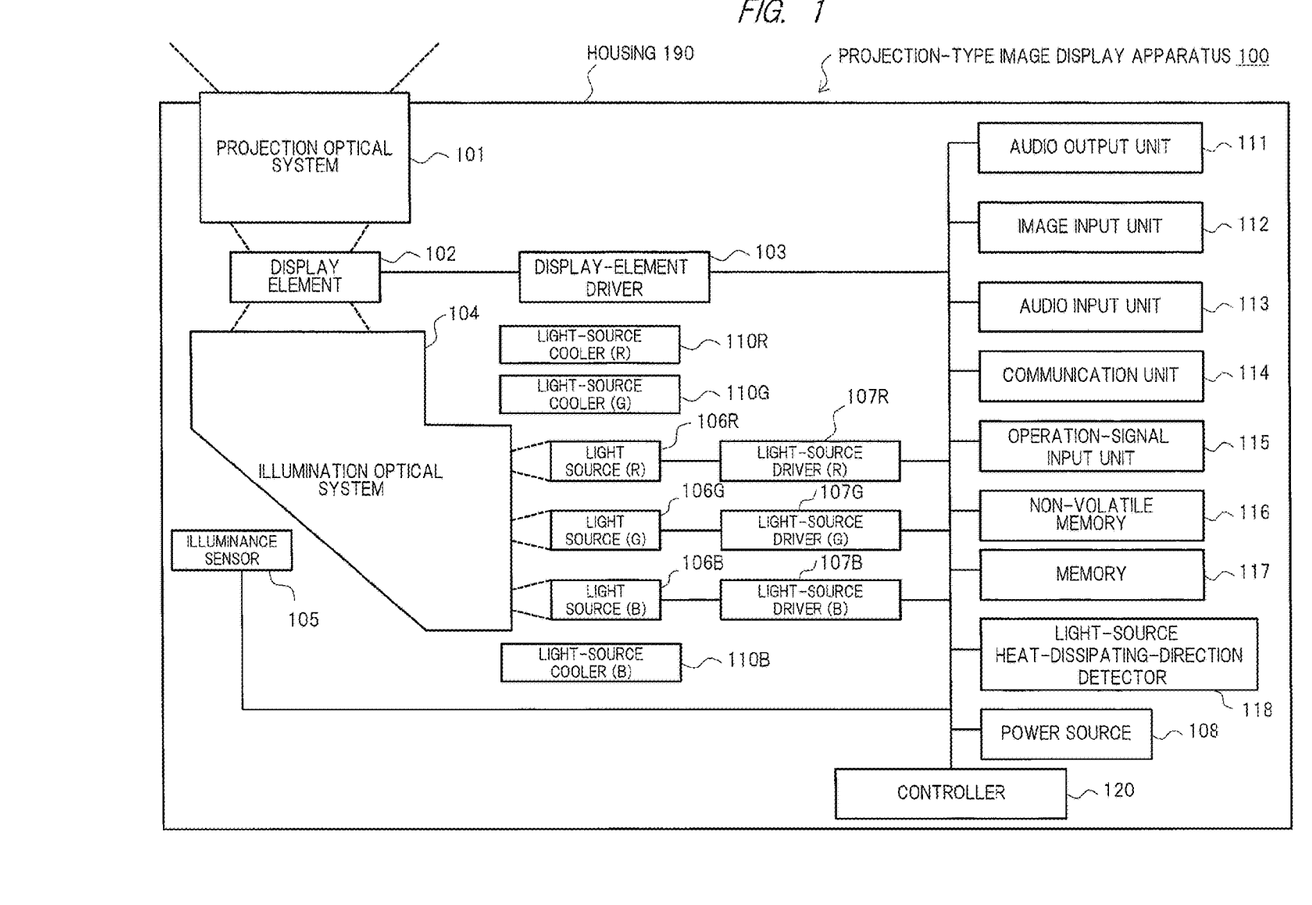
FIG. 1 is a diagram showing an outline related to a configuration example of a projection-type image display apparatus according to one embodiment of the present invention.
Figure 2:
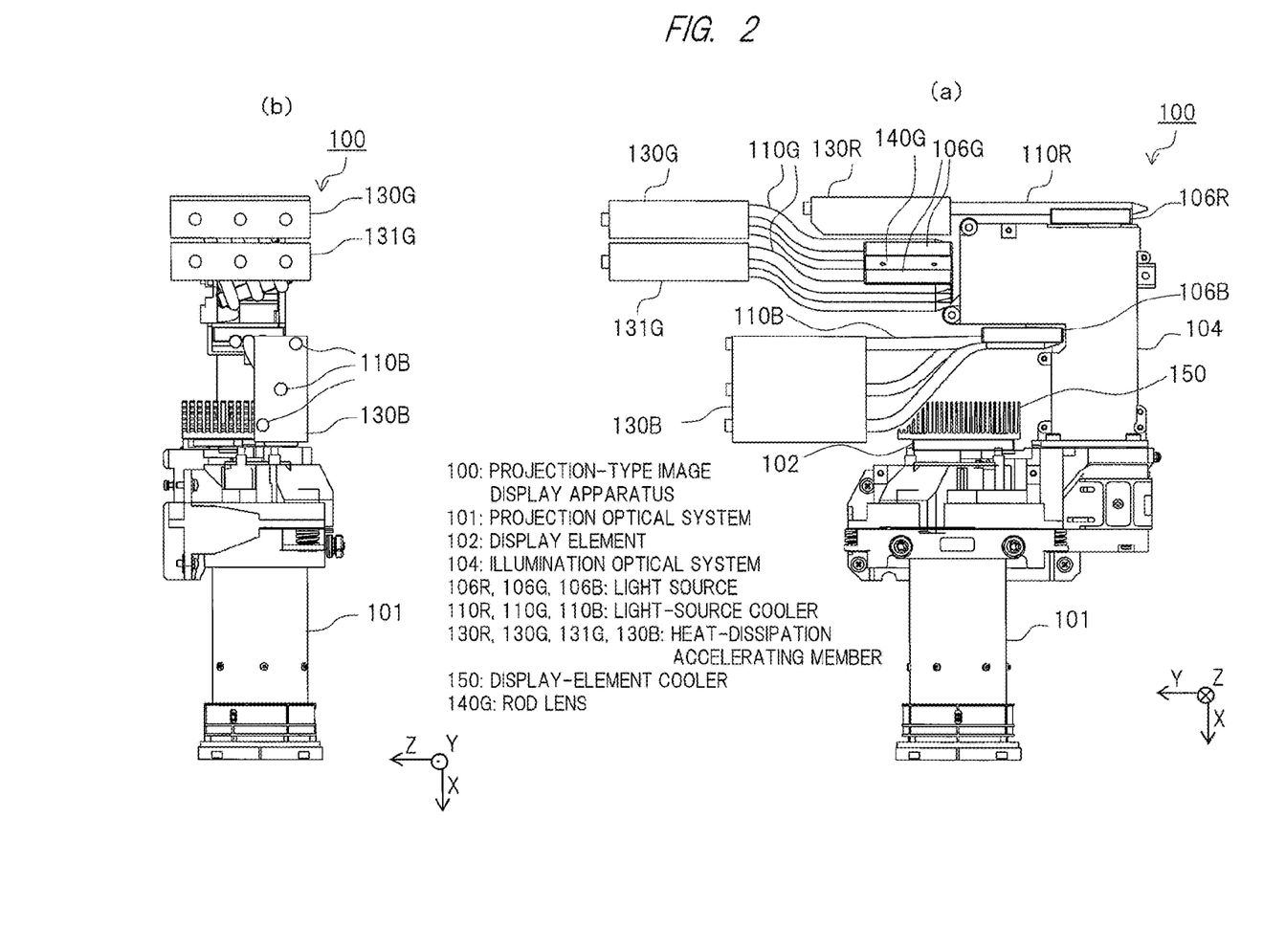
Figure 3:
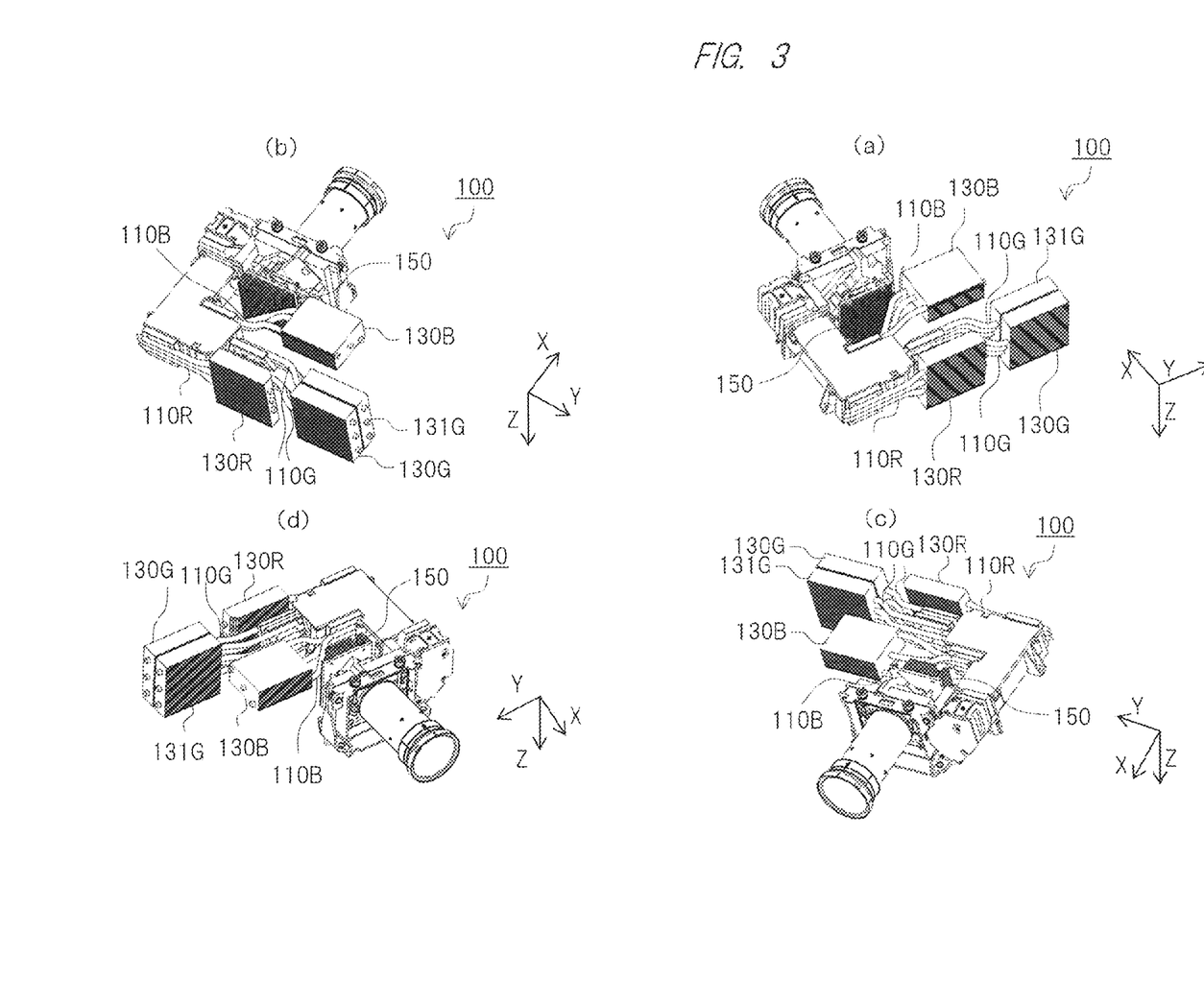

FIG. 1 is a diagram showing an outline related to a configuration example of a projection-type image display apparatus according to one embodiment of the present invention. FIG. 2 is diagrams each schematically showing a specific configuration example related to an internal structure of the projection-type image display apparatus according to the present embodiment. FIG. 2 (a) is a diagram schematically showing the internal structure of the projection-type image display apparatus in a positive direction of a "Z" axis, and FIG. 2 (b) is a diagram schematically showing the internal structure of the projection-type image display apparatus in a negative direction of a "Y" axis. FIG. 3 is perspective views each schematically showing the configuration example related to the internal structure of the projection-type image display apparatus according to the present embodiment, as viewed from each direction. In FIG. 1, a projection-type image display apparatus 100 is, for example, a liquid crystal projector or others that receives power supply from an external power source not illustrated and projects images onto a screen not illustrated so as to expand and display the images.

As shown in FIG. 1, the projection-type image display apparatus 100 includes, inside a housing 190, respective units such as a projection optical system 101, a display element 102, a display-element driver 103, an illumination optical system 104, a an illuminance sensor 105, a light source 106R, a light source 106G, alight source 106B, a light-source driver 107R, a light-source driver 107G, a light-source driver 107B, a power source 108, a light-source cooler 110R, a light-source cooler 110G, a light-source cooler 110B, an audio output unit 111, an image input unit 112, an audio input unit 113, a communication unit 114, an operation-signal input unit 115, a non-volatile memory 116, a memory 117, a light-source heat-dissipating-direction detector 118, and a controller 120.

The light-source driver 107R drives the light source 106R in accordance with the control from the controller 120 described later. The light-source driver 107G drives the light source 106G in accordance with the control from the controller 120 described later. The light-source driver 107B drives the light source 106B in accordance with the control from the controller 120 described later.

The light source 106R emits red color (R) light of the light for the image projection, on the basis of the control from the light-source driver 107R.

The light source 106G emits green color (G) light of the light for the image projection, on the basis of the control from the light-source driver 107G. As shown in FIG. 2 (a), the light source 106G is configured in combination with a rod lens 140G. The rod lens 140G collects the light emitted from the light source 106G, shapes the light into a sheet form, or causes the light to diverge.

The light source 106B emits blue color (B) light of the light for the image projection, on the basis of the control from the light-source driver 107B.

Each of the light source 106R, the light source 106G, and the light source 106B is configured of, for example, an LED (Light Emitting Diode) light source, a laser light source, or others.

The illumination optical system 104 is an optical system having an optical element such as one or more lenses that converges the light emitted from each of the light source 106R, the light source 106G, and the light source 106B to generate white color light.

The illuminance sensor 105 senses a light amount of the light for image projection in the illumination optical system 104, and transmits the sensed light-amount data to the controller 120.

The display element 102 is configured of a transmissive-type or a reflective-type liquid crystal panel, a DMD (Digital Micromirror Device: registered mark) panel or others. The display element 102 forms images to be projected, on the basis of image data transmitted from the controller 120. The display element 102 transmits or reflects the light converged by the illumination optical system 104 to project the images formed on the element.

The projection optical system 101 is an optical system having an optical element such as one or more lenses or mirrors that expands and projects an optical image of the display element 102 as the image onto a screen or others not illustrated.

The audio output unit 111 includes a speaker, an external output terminal, or others, that outputs audio data related to the display image, or outputs an alert sound, a warning sound, audio data, or others related to an operation of the projection-type image display apparatus 100, an error thereof, or others.

The image input unit 112 is an external interface that receives the data input of the image to be projected, from an information processing terminal such as a not-illustrated PC (Personal Computer) connected through a not-illustrated image input terminal, and that transmits the image data to the controller 120. Note that the image input terminal may include a plurality of types of image input terminals such as an HDMI (High-Definition Multimedia Interface, registered mark), a VGA (Video Graphics Array), and a DVI (Digital Visual Interface).

From an information processing terminal connected through an external interface, the audio input unit 113 inputs audio data or others related to the data of the image to be projected. The buffering for the input image data and audio data may be performed in the memory 117 described later.

The communication unit 114 has functions of communicating with a not-illustrated information processing terminal such as a PC, a tablet terminal, and a smartphone to input/output various control signals or others. The operation-signal input unit 115 is an input interface for performing an operation to the projection-type image display apparatus 100, is configured of, for example, an operation button formed on a main body of the projection-type image display apparatus 100 or a light-receiving part of a remote controller, and inputs operation data from a user.

The operation-signal input unit 115 is an external interface that receives an input of an instruction for the projection-type image display apparatus 100 as a result of an operation of a not-illustrated button or others from the user through a not-illustrated panel or others formed in a housing 190 being an outer package of the projection-type image display apparatus 100, and that transmits the input to the controller 120. The operation-signal input unit 115 includes, for example, a receptor, and the receptor may be configured so as to receive an operation through the remote controller or others not illustrated.

The non-volatile memory 116 is configured of a non-volatile memory such as a flash memory. The non-volatile memory 116 stores a control program of the projection-type image display apparatus 100, the image data such as a display icon for various operations, the audio data such as the alert sound or the warning sound related to the operations, the errors, or others. And, this may store image data (including a template image or others) used for projecting the image by using the single projection-type image display apparatus 100.

The memory 117 is configured of a volatile memory such as a DRAM (Dynamic Random Access Memory). The memory 117 develops and stores the control program, the various control data for the projection-type image display apparatus 100, or others stored in the non-volatile memory 116. The memory 117 performs the buffering of the image data or the audio data of the projection target input through the image input unit 112 or others.

The light-source heat-dissipating-direction detector 118 detects the light-source heat dissipating directions of the light-source heat dissipating parts 110R, 110G, and 110B described later. The light-source heat-dissipating-direction detector 118 transmits the detected light-source heat-dissipating-direction data to the controller 120. Note that the light-source heat dissipating direction will be described later.

The power source 108 receives power supply from an external power source not illustrated, and supplies power for the operation to each unit configuring the projection-type image display apparatus 100.

The controller 120 has functions of controlling the operation of each unit of the projection-type image display apparatus 100 by, for example, performing an operation of a microcomputer, executing a control program by usage of a CPU (Central Processing Unit), or others, the operation being such as the formation of the projected image by usage of the display element 102, the image projection by the controls of the light-source drivers 107R, 107G, and 107B, the control of the light amount on the basis of the light amount data received from the illuminance sensor 105, the control on the basis of the light-source heat-dissipating-direction data received from the light-source heat-dissipating-direction detector 118.

<Configuration of Light-Source Cooler>

Next, the light-source coolers 110R, 110G and 110B for cooling the light sources 106R, 106G and 106B will be described. Each of the light-source coolers 110R, 110G and 110B is configured of, for example, a heat pipe or others. The heat pipe is desirably made of a material excellent in thermal conductivity. As a suitable material for the heat pipe, for example, a metal such as copper is cited.

The light-source cooler 110R is a member cooling the light source 106R. As shown in FIG. 2 (a), one end of the light-source cooler 110R is provided so as to be in contact with the light source 106R, and the other end of the same extends so as to be provided in a substantially positive direction of the "Y" axis in the drawing with reference to one end.

The light-source cooler 110R absorbs the heat of the light source 106R from its one end being in contact with the light source 106R, thermally conducts the absorbed heat toward the other end, and dissipates the heat from the other end. The heat dissipated from the light-source cooler 110R is exhausted out of the apparatus through an outlet not illustrated. That is, one end of the light-source cooler 110R functions as a heat absorbing part for absorbing the heat of the light source 106R, and the other end of the light-source cooler 110R functions as a heat dissipating part for dissipating the heat of the light source 106R.

The light-source cooler 110G is a member that cools the light source 106G. As shown in FIG. 2 (a), one end of the light-source cooler 110G is provided so as to be in contact with the light source 106G, and the other end of the same extends so as to be provided in the substantially positive direction of the "Y" axis in the drawing with reference to one end. As described above, the light source 106G is configured to be combined with the rod lens 140G. Therefore, an end of the light-source cooler 110G, the end being closer to the light source 106G, is arranged so as to be in directly or thermally contact with the light source 106G and the rod lens 140G.

The light-source cooler 110G absorbs the heat of the light source 106G and the rod lens 140G from its one end being in contact with the light source 106G, thermally conducts the absorbed heat toward the other end, and dissipates the heat from the other end. The heat dissipated from the light-source cooler 110G is exhausted out of the apparatus through an outlet not illustrated. That is, one end of the light-source cooler 110G functions as a heat absorbing part for absorbing the heat of the light source 106G and the rod lens 140G, and the other end of the light-source cooler 110G functions as a heat dissipating part for dissipating the heat of the light source 106G and the rod lens 140G.

The light-source cooler 110B is a member that cools the light source 106B. As shown in FIG. 2 (a), one end of the light-source cooler 110B is provided so as to be in contact with the light source 106B, and the other end of the same extends so as to be provided in the substantially positive direction of the "Y" axis in the drawing with reference to one end.

The light-source cooler 110B absorbs the heat of the light source 106B from its one end being in contact with the light source 106B, thermally conducts the absorbed heat toward the other end, and dissipates the heat from the other end. The heat dissipated from the light-source cooler 110B is exhausted out of the apparatus through an outlet not illustrated. That is, one end of the light-source cooler 110B functions as a heat absorbing part for absorbing the heat of the light source 106B, and the other end of the light-source cooler 110B functions as a heat dissipating part for dissipating the heat of the light source 106B.

In comparison among these light-source coolers 110R, 110G and 110B, all the light-source heat dissipating directions, each of which is a direction toward the heat dissipating part in each of the light-source coolers 110R, 110G and 110B with reference to the heat absorbing part, are the positive direction in the Y axis to be substantially the same as one another as shown in FIGS. 2 and 3.

In the above description, the number of each of the light-source coolers 110R, 110G and 110B of the respective light sources 106R, 106G and 106B has not been particularly described. However, for example, as shown in FIGS. 2 and 3, a plurality of light-source coolers may be provided for each of all the light sources 106R, 106G and 106B, or the plurality of light-source coolers 110R, 110G and 110B may be provided for only any of the light sources 106R, 106G and 106B. For example, the number of the light-source coolers can be one or plural for the light source having the small heat generating amount, and the number of the light-source coolers can be larger for the light source having the large heat generating amount.

In the present embodiment, for example, as shown in FIGS. 2 and 3, heat-dissipation accelerating members 130R, 130G, 131G and 130B may be provided in the heat dissipating parts of the light-source coolers 110R, 110G and 110B. Each of the heat-dissipation accelerating members 130R, 130G, 131G and 130B is desirably made of a material excellent in thermal conductivity. As a material of a heat dissipating fin, for example, a metal such as copper or aluminum is cited.

Each of the heat-dissipation accelerating members 130R, 130G, 131G and 130B may be formed of a heat dissipating fin or others. The heat dissipating fin may be made of, for example, a plate-shaped member that covers each heat dissipating part of the light-source coolers 110R, 110G and 110B. Alternatively, each of the heat-dissipation accelerating members 130R, 130G, 131G and 130B may be formed of a heatsink. By the heatsink, contact areas of the heat dissipating parts of the light-source coolers 110R, 110G and 110B with air can be further increased so as to accelerate the heat dissipation from the heat dissipating parts of the light-source coolers 110R, 110G and 110B.

The heat-dissipation accelerating member 130R is arranged so as to expand on a Y-Z plane as shown in FIGS. 2 (a) and 3. The heat-dissipation accelerating member 130R covers the heat dissipating parts of three light-source cooler 110R that are arranged along the "Z" axis on the Y-Z plane. The heat-dissipation accelerating member 130R increases the contact areas of the heat dissipating parts of the light-source coolers 110R with the air so as to accelerate the heat dissipation from the heat dissipating parts of the light-source coolers 110R.

The heat-dissipation accelerating members 130G and 131G are arranged so as to expand on the Y-Z plane as shown in FIGS. 2 and 3. The heat-dissipation accelerating member 130G covers the heat dissipating parts of three light-source coolers 110G of six light-source coolers 110G, these light-source coolers being closer to the light source 106R in the drawing. The heat-dissipation accelerating member 131G covers the cooling units of three light-source coolers 110G of six light-source coolers 110G, these light-source coolers being closer to the light source 106R. The heat-dissipation accelerating members 130G and 131G increase the contact areas of the heat dissipating parts of the light-source coolers 110G with the air so as to accelerate the heat dissipation from the heat dissipating parts of the light-source coolers 110G.

The heat-dissipation accelerating member 130B is arranged so as to expand on an X-Y plane as shown in FIGS. 2 and 3. The heat-dissipation accelerating member 130B covers the heat dissipating parts of three light-source coolers 110B that are arranged along the "X" direction. The heat-dissipation accelerating member 130B increases the contact areas of the heat dissipating parts of the light-source coolers 110B with the air so as to accelerate the heat dissipation from the heat dissipating parts of the light-source coolers 110B.

As described above, in the projection-type image display apparatus 100 according to the first embodiment of the present invention, the light-source coolers 110R, 110G and 110B of the respective light sources 106R, 106G and 106B are arranged so that the light-source heat dissipating directions of them are in substantially the same direction as one another (the positive direction of the Y axis), and therefore, the heat generated from the respective light sources 106R, 106G and 106B can be moved in substantially the same direction as one another. In this manner, regions to which the heat generated from the respective light sources 106R, 106G and 106B is dissipated can be collected to a predetermined region inside the apparatus, so that the heat can be effectively exhausted out of the apparatus. As a result, temperature rise inside the apparatus can be suppressed, and therefore, the light sources 106R, 106G and 106B can be effectively cooled.

When the heat-dissipation accelerating members 130R, 130G, 131G and 130B are used for the heat dissipating parts of the light-source coolers 110R, 110G and 110B, the contact areas of the heat dissipating parts of each of the light-source coolers 110R, 110G and 110B with the air can be increased. In this manner, the heat dissipation through the heat dissipating parts of the light-source coolers 110R, 110G and 110B can be accelerated, so that cooling efficiencies of the light sources 106R, 106G and 106B can be more improved.

In the present embodiment, the number of each of the light-source coolers 110R, 110G and 110B of the respective light sources 106R, 106G and 106B can be plural, and therefore, the cooling for the respective light sources 106R, 106G and 106B by using the light-source coolers 110R, 110G and 110B can be more effectively performed.

In the present embodiment, the number of each of the light-source coolers 110R, 110G and 110B can be appropriately set in accordance with the heat generation amount from each of the light sources 106R, 106G and 106B. In this manner, the temperature of each of the light sources 106R, 106G and 106B can be controlled so that the light amount of each of the light sources 106R, 106G and 106B is within a predetermined range, so that the color unbalance in the projected image can be suppressed.

In the present embodiment, light-source cooling directions of the light-source coolers 110R, 110G and 110B are aligned in substantially the same direction as one another, and therefore, the heat generated from any of the light source 106R, 106G or 106B is difficult to interfere with another light source 106R, 106G or 106B. Therefore, the light amounts of the light sources 106R, 106G and 106B of three colors (red, green and blue) change in the similar tendency to one another, and thus, the color unbalance in the projection light is difficult to occur. Such a configuration is particularly effective for a projection-type image display apparatus not having a feedback function that controls the light amount while sensing the light amount of each color.

Second Embodiment

Figure 4:
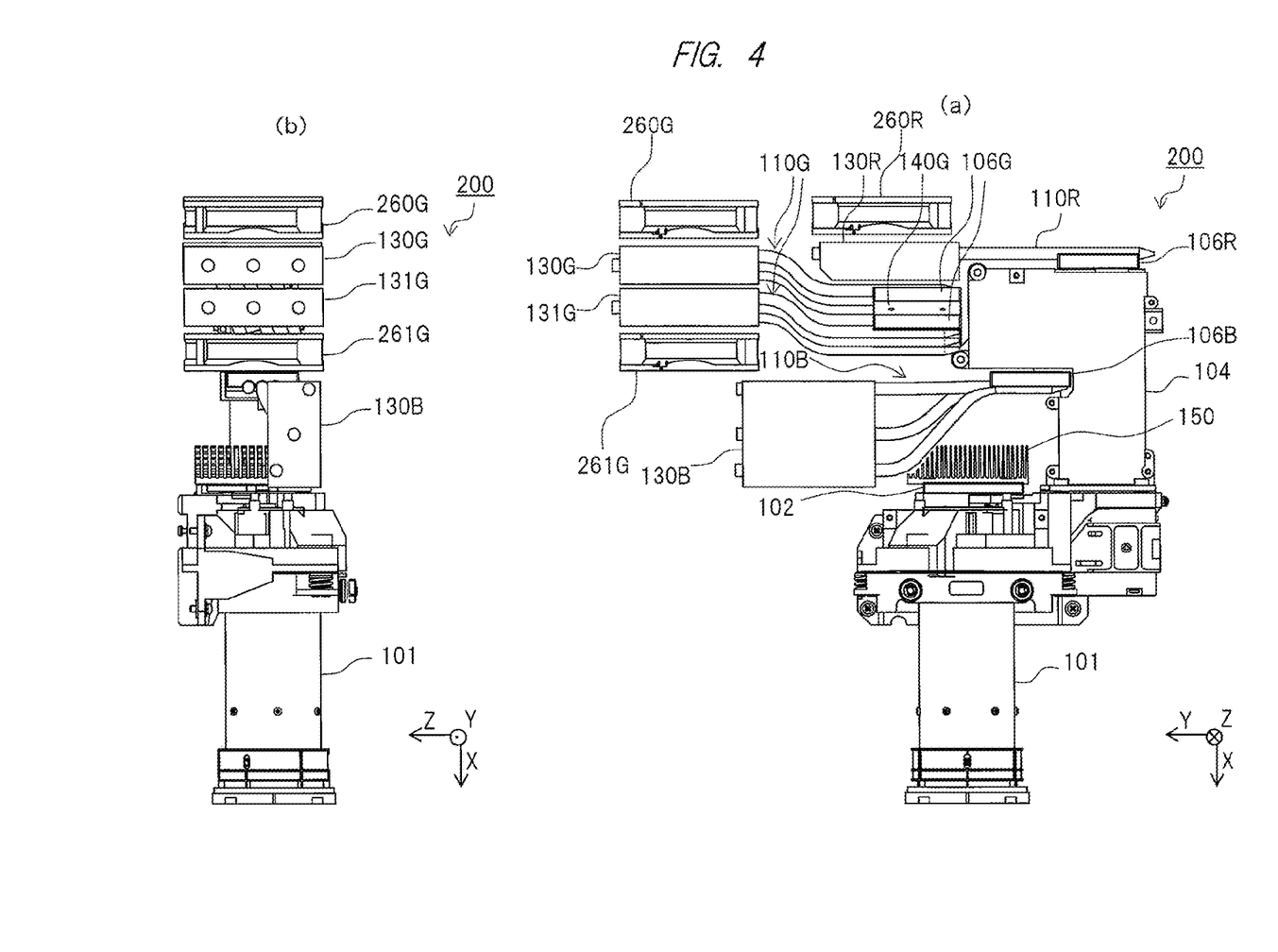
Figure 5:
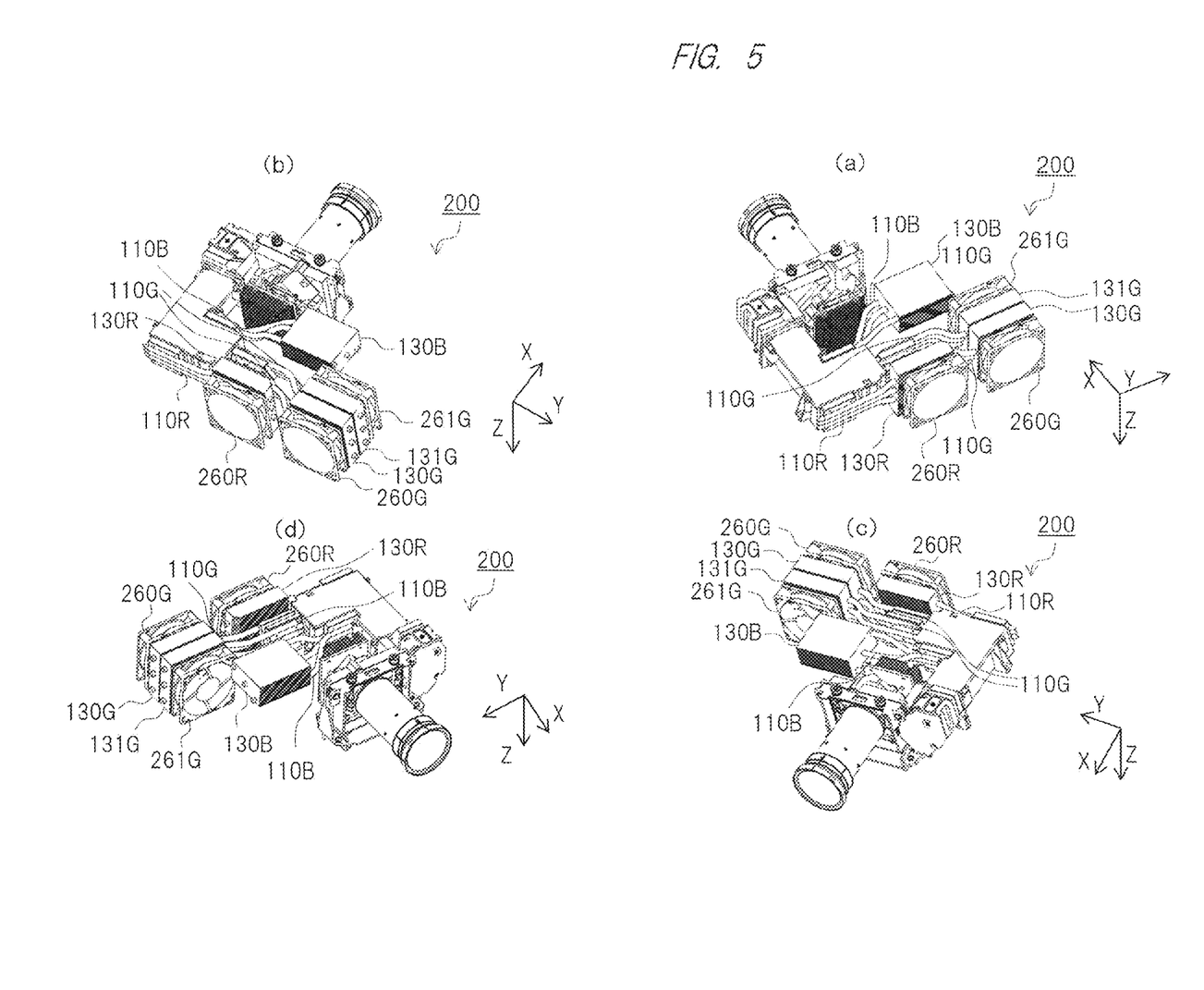

Next, a second embodiment of the present invention will described. FIG. 4 is diagrams each showing an outline related to a configuration example of a projection-type image display apparatus according to one embodiment of the present invention. FIG. 5 is perspective views each schematically showing a configuration example related to an internal structure of the projection-type image display apparatus according to one embodiment of the present invention, as viewed from each direction.

As shown in FIGS. 4 and 5, a projection-type image display apparatus 200 according to the present second embodiment is configured by adding cooling fans 260R, 260G and 261G to the projection-type image display apparatus 100 according to the first embodiment. The cooling fans 260R, 260G and 261G accelerate the heat dissipation from the heat dissipating parts of the light-source coolers 110R, 110G and 110B, and accelerate the exhaust of the heat dissipated from the heat dissipating parts of the light-source coolers 110R, 110G and 110B to the outside of the apparatus.

The cooling fans 260R, 260G and 261G are controlled by the controller 120 so as to operate during not only the image projection but also a predetermined period of time after the end of the image projection followed by the stoppage of the light emission of the respective light sources 106R, 106G and 106B, or operate until the temperatures of the respective light sources 106R, 106G and 106B decrease down to a predetermined temperature.

As shown in FIGS. 4 (*a*) and 5, the cooling fan 260R is arranged so as to cover the heat-dissipation accelerating member 130R from a negative side of the heat-dissipation accelerating member 130R in the X axis. Toward the heat-dissipation accelerating member 130R (in the positive direction of the X axis in the drawing), the cooling fan 260R feeds cooling air that accelerates the heat dissipation from the heat dissipating parts of the light-source coolers 110R. The heat dissipating parts of the light-source coolers 110R arranged inside the heat-dissipation accelerating member 130R are arranged so as to be adjacent to one another in the Z axis direction in the drawing in a flow path of the cooling air. When the cooling air is fed from the cooling fan 260R, the heat-dissipation accelerating member 130R is cooled, so that the light-source coolers 110R are cooled.

As shown in FIGS. 4 and 5, the cooling fan 260G is arranged so as to cover the heat-dissipation accelerating member 130G from a negative side of the heat-dissipation accelerating member 130G in the X axis. Toward the heat-dissipation accelerating member 130G (in the positive direction of the X axis in the drawing), the cooling fan 260G feeds cooling air that accelerates the heat dissipation from the heat dissipating parts of the light-source coolers 110G connected to the heat-dissipation accelerating member 130G. The heat dissipating parts of the light-source coolers 110G arranged inside the heat-dissipation accelerating member 130G are arranged so as to be adjacent to one another in the Z axis direction in the drawing in a flow path of the cooling air. When the cooling air is fed from the cooling fan 260G, the heat-dissipation accelerating member 130G is cooled, so that the light-source coolers 110G connected to the heat-dissipation accelerating member 130G are cooled.

As shown in FIGS. 4 and 5, the cooling fan 261G is arranged so as to cover the heat-dissipation accelerating member 131G from a positive side of the heat-dissipation accelerating member 131G in the X axis. Toward the heat-dissipation accelerating member 131G (in the negative direction of the X axis in the drawing), the cooling fan 261G feeds cooling air that accelerates the heat dissipation from the heat dissipating parts of the light-source coolers 110G connected to the heat-dissipation accelerating member 131G. The heat dissipating parts of the light-source coolers 110G arranged inside the heat-dissipation accelerating member 131G are arranged so as to be adjacent to one another in the Z axis direction in the drawing in a flow path of the cooling air. When the cooling air is fed from the cooling fan 261G, the heat-dissipation accelerating member 131G is cooled, so that the light-source coolers 110G connected to the heat-dissipation accelerating member 131G are cooled.

As shown in FIGS. 4 and 5, the cooling fan that accelerates the cooling of the heat dissipating parts of the light-source coolers 110B is not provided for the light source 106B. In this case, the heat dissipating parts of the light-source coolers 110B cannot be directly cooled by the cooling fan. However, for example, the cooling air fed from the cooling fans 260R, 260G and 261G cools the respective heat-dissipation accelerating members 130R, 130G and 131G, and then, indirectly cools the heat-dissipation accelerating member 130B, so that the heat dissipating parts of the light-source coolers 110B are cooled.

In the projection-type image display apparatus 200 according to the second embodiment of the present invention, the heat dissipating parts of the light-source coolers 110R, 110G and 110B are cooled by the cooling air fed from the cooling fans 260R, 260G and 261G, so that the heat dissipation from the heat dissipating parts of the light-source coolers 110R, 110G and 110B is more accelerated. And, when the projection-type image display apparatus is configured so as to be combined with the heat-dissipation accelerating members 130R, 130G, 131G and 130B, the heat dissipation from the heat dissipating parts of the light-source coolers 110R, 110G and 110B is more accelerated, so that the cooling efficiencies for the respective light sources 106R, 106G and 106B can be further improved.

When a plurality of the light-source coolers 110R, 110G and 110B are provided as shown in FIG. 4, it is preferable to arrange the heat dissipating parts of the light-source coolers 110R, 110G and 110B so as not to cross one another in the flow path direction of the cooling air.

Regarding, for example, the light-source coolers 110B as shown in FIG. 4 (*b*), the heat dissipating parts of the plurality of light-source coolers 110B are obliquely arranged from the negative side of the X axis and the negative side of the Z axis toward the positive side of the X axis and the positive side of the Z axis on the X-Z plane so as not to cross one another in the flow path direction of the cooling air.

As a result of such arrangement of the heat dissipating parts of the light-source coolers 110B, the heat dissipating parts of the light-source coolers 110B are evenly cooled by the cooling air flowing in the flow path direction (for example, the positive direction of the X axis). This manner can suppress the uneven cooling among the plurality of light-source coolers 110B when the heat dissipating parts of the light-source coolers 110B are cooled, and therefore, can suppress the reduction in the cooling efficiencies of the light-source coolers 110B for the light source 106B.

As the result of such arrangement of the heat dissipating parts of the light-source coolers 110B, the heat dissipating parts of the light-source coolers 110B can be indirectly cooled by the cooling air flowing from a direction that is different from the original flow path direction. This manner can suppress the uneven cooling caused when the heat dissipating parts of the light-source coolers 110B are cooled, and can suppress the reduction in the cooling efficiencies of the light-source coolers 110B for the light source 106B. Such a configuration is particularly effective for the case without the heat-dissipation accelerating member 130B.

With reference to FIGS. 4 and 5, the case of arrangement of the heat dissipating parts of the plurality of light-source coolers 110B in the flow path direction of the cooling air has been described. Also in a case of, for example, arrangement of the heat dissipating parts of the light-source coolers 110R and 110G in the flow path direction of the cooling air, the same configuration is preferable.

In FIGS. 4 and 5, the cooling fan for directly cooling the heat dissipating parts of the light-source coolers 110B is not provided. However, for each of the light sources 106R, 106G and 106B, the cooling fan that accelerates the heat dissipation from each of the heat dissipating parts of the light-source coolers 110R, 110G and 110B may be provided.

By such a configuration, the heat dissipation from each of the heat dissipating parts of all the light-source coolers 110R, 110G and 110B is accelerated, and therefore, the uneven cooling among the light sources 106R, 106G and 160B can be suppressed, and the cooling efficiencies for the light sources 106R, 106G and 160B can be improved.

Third Embodiment

Next, the third embodiment of the present invention will be described. The projection-type image display apparatus according to the present embodiment is provided with a display-element cooler 150 for cooling the display element 102. Note that the display-element cooler 150 is used in both the projection-type image display apparatuses 100 and 200 according to the above-described first and second embodiments, and therefore, the embodiment will be mainly described with reference to FIGS. 2 and 3 related to the first embodiment.

As shown in FIGS. 2 and 3, the display-element cooler 150 is arranged so as to cover the display element 102 from the negative side of the display element 102 in the X axis, and is thermally in contact with the display element 102. The display-element cooler 150 is desirably made of a material excellent in thermal conductivity. As the material of the display-element cooler 150, for example, a metal such as copper or aluminum is cited.

The display-element cooler 150 is formed of, for example, a heatsink as shown in FIGS. 2 and 3. The heat generated from the display element 102 is absorbed by the display-element cooler 150, and the absorbed heat is dissipated from the display-element cooler 150. In this manner, the display element 102 is cooled.

In the projection-type image display apparatuses 100 and 200 according to the present third embodiment, the heat generated when the light from the light sources 106R, 106G and 160B reflects or transmits and the heat generated when the projection image is formed are absorbed from the display element 102 to the display-element cooler 150. This manner can suppress the temperature rise of the display element 102, and can suppress the reduction in the quality of the projection image formed on the display element 102.

Alternatively, the display-element cooler 150 may be formed of a heat pipe. In this case, it is preferable to arrange a display-element heat dissipating direction of the display-element cooler 150 so as to be substantially the same as the light-source heat dissipating directions of the light-source coolers 110R, 110G and 110B, the display-element heat dissipating direction being a direction toward a heat dissipating part for dissipating the heat of the display element 102 with reference to a heat absorbing part for absorbing the heat of the display element 102. For example, it is preferable to arrange one end of the display-element cooler 150 formed of the heat pipe so as to be in contact with the display element 102, and arrange the other end of the same so as to extend in the substantially positive direction of the Y axis in FIG. 2 (*a*) with reference to the one end.

When the display-element cooler 150 is formed of the heat pipe, the display-element cooler 150 absorbs the heat of the display element 102 from its one end being in contact with the display element 102, thermally conducts the absorbed heat toward the other end, and dissipates the heat from the other end. The heat dissipated from the display-element cooler 150 is exhausted out of the apparatus through an outlet not illustrated. That is, one end of the display-element cooler 150 functions as the heat absorbing part for absorbing the heat of the display element 102, and the other end of the display-element cooler 150 functions as the heat dissipating part for dissipating the heat of the display element 102.

When the display-element cooler 150 is formed of the heat pipe, by such a configuration, the display-element heat dissipating direction of the display-element cooler 150 that is the direction toward the heat dissipating part with reference to the heat absorbing part can be set to the substantially positive direction in the Y axis so as to be substantially the same as the light-source heat dissipating directions of the light-source coolers 110R, 110G and 110B that are the directions toward the heat dissipating parts with reference to the heat absorbing parts. In this manner, the heat generated from the display element 102 can be moved without the interference to another light source 106R, 106G or 160B. Further, the light amounts of the light sources 106R, 106G and 160B of the three colors (red, green and blue) change in the same tendency as one another with the temperature rise of the display element 102 suppressed and with the reduction in the quality of the projection image formed on the display element 102 suppressed, and therefore, the color unbalance in the projection light is difficult to occur. As a result, the reduction in the quality of the projection image can be further suppressed.

Alternatively, the display-element cooler 150 may be formed of a plurality of the heat pipes. In this case, it is preferable to arrange the display-element heat dissipating directions of all the display-element coolers 150 so as to be substantially the same as the light-source heat dissipating directions. And, a heat-dissipation accelerating member that accelerates the heat dissipation from the heat dissipating parts of the display-element coolers 150 may be provided to the heat dissipating parts of the display-element coolers 150, or a cooling fan for further accelerating the heat dissipation from the heat dissipating parts of the display-element coolers 150 may be provided.

By such a configuration, the cooling efficiencies of the display-element coolers 150 for the display element 102 can be further improved, so that the reduction in the quality of the projection image can be further suppressed.

Fourth Embodiment

Figure 6:
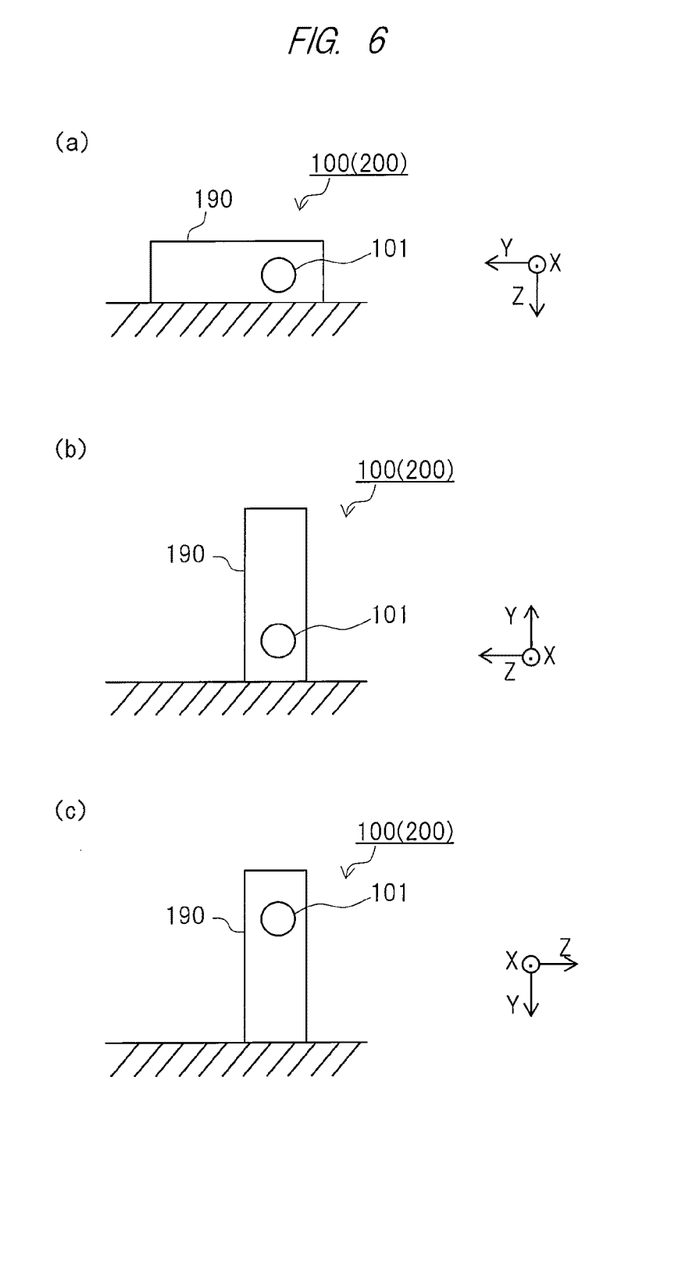
FIG. 6 is diagrams each schematically showing one example of a usage state of the projection-type image display apparatus according to the present embodiment.

Next, the fourth embodiment of the present invention will be described. The present embodiment will describe a case of usage of the projection-type image display apparatus with a horizontal display mode (first display mode) and a vertical display mode (second display mode) switched. Note that the contents related to the present embodiment are applied to both the projection-type image display apparatuses 100 and 200 according to the above-described first to third embodiments, and therefore, the description will be made mainly with reference to FIGS. 1, 2, 3 and 6 according to the first embodiment. FIG. 6 is diagrams each schematically showing one example of a usage state of the projection-type image display apparatus according to the present embodiment. FIG. 6 (*a*) is a diagram schematically showing one example of a usage state of the projection-type image display apparatus in the horizontal display mode. FIG. 6 (*b*) is a diagram schematically showing one example of a usage state of the projection-type image display apparatus in the vertical display mode. FIG. 6 (*c*) is a diagram schematically showing one example of a usage state that is different from a normal usage state.

The horizontal display mode means an image projection mode setting a short-side direction (for example, the Z-axis direction in FIG. 2) of the image formed on the display element 102 as a longitudinal direction of the projected image and setting a long-side direction (for example, the Y-axis direction in FIG. 2) of the image formed on the display element 102 as a lateral direction of the projected image.

The vertical display mode means an image projection mode setting the long-side direction (for example, the Y-axis direction in FIG. 2) of the image formed on the display element 102 as the longitudinal direction of the projected image and setting the short-side direction (for example, the Z-axis direction in FIG. 2) of the image formed on the display element 102 as the lateral direction of the projected image.

In the present embodiment, the horizontal display mode and the vertical display mode are switched to each other by change in an orientation of the projection-type image display apparatus 100. At this time, the projection-type image display apparatus 100 is arranged so that the light-source heat dissipating directions of these light-source coolers 110R, 110G and 110B are a horizontal direction (for example, the X-Y plane direction) or upper than the horizontal direction (for example, in the negative direction in the Z axis).

That is, as the orientation of the projection-type image display apparatus 100 in the horizontal display mode, for example, the positive side in the Z axis is placed on a floor as shown in FIG. 6 (a). At this time, the light-source heat dissipating directions of the light-source coolers 110R, 110G and 110B are the positive direction in the Y axis that is substantially the horizontal direction.

On the other hand, as the orientation of the projection-type image display apparatus 100 in the vertical display mode, for example, the negative side in the Y axis is placed on the floor as shown in FIG. 6 (b). At this time, the light-source heat dissipating directions of the light-source coolers 110R, 110G and 110B are the positive direction in the Y axis that is substantially an orthogonal upward direction being upper than the horizontal direction.

By such a configuration, the heat dissipating parts of the light-source coolers 110R, 110G and 110B are arranged to be horizontal to the heat absorbing parts or upper than the heat absorbing parts. In this manner, even if a positional relation among the light-source coolers 110R, 110G and 110B is changed by the switching of the display mode, the light amounts of the light sources 106R, 106G and 106B on the basis of the light-source coolers 110R, 110G and 110B change in the same tendency as one another, and therefore, the color unbalance in the projection light is difficult to occur. Such a configuration is particularly effective for a projection-type image display apparatus not having a feedback function that controls the light amount while sensing the light amount of each color.

When the projection-type image display apparatus has the feedback function, even if the light amounts change, the light amounts can be easily controlled by the switching of the horizontal display mode and the vertical display mode in the usage.

And, for example, FIG. 6 (c) shows the orientation of the projection-type image display apparatus 100 in another vertical display mode. In this case, the heat dissipating parts of the light-source coolers 110R, 110G and 110B are arranged to be lower than the heat absorbing parts thereof. This case is severer in all the cooling performances of all the light-source coolers 110R, 110G and 110B than the cases in the examples of FIGS. 6 (a) and (b), and therefore, the light amounts of the light sources 106R, 106G and 106B are reduced. However, in the projection-type image display apparatus 100 of the present invention, the light-source heat dissipating directions of the light-source coolers 110R, 110G and 110B are equalized to one another, and therefore, the light amounts are reduced in the same tendency as one another. Therefore, in the projection-type image display apparatus 100 of the present invention, although the projection light is reduced, the color unbalance is difficult to occur even in the orientation as shown in the example of FIG. 6 (c).

Note that the orientation as shown in the example of FIG. 6 (c) reduces the cooling efficiencies of all the light-source coolers 110R, 110G and 110B. Therefore, if the light-source heat-dissipating-direction detector 118 detects the orientation as shown in the example of FIG. 6 (c), the light-source driver 107R, the light-source driver 107G and the light-source driver 107B may be controlled so that each light amount of the light source 106R, the light source 106G and the light source 106B is reduced to suppress the heat generation amount of the entire light source, and suppress the temperature rise of the light sources. And, when the apparatus has the cooling fans 260R, 260G and 261G, if the light-source heat-dissipating-direction detector 118 detects the orientation as shown in the example of FIG. 6 (c), each rotation speed of the cooling fans 260R, 260G and 261G may be increased to suppress the temperature rise of the light sources. Alternatively, the reduction in each of the light amounts and the increase in the rotation speed of each cooling fan may be simultaneously applied.

When the horizontal display mode and the vertical display mode are switched to each other, if the light-source heat-dissipating-direction detector 118 shown in FIG. 1 detects that the light-source heat dissipating directions of the light-source coolers 110R, 110G and 110B are lower than the horizontal direction, the controller 120 may form, on the display element 102, a message or an image notifying a user that the orientation of the projection-type image display apparatus 100 is different from a predetermined orientation.

For example, when the positive side of the projection-type image display apparatus 100 in the Z axis is placed on the floor (as the horizontal display mode) or when the negative side of the same in the Y axis is placed on the floor (as the vertical display mode), the light-source heat-dissipating-direction detector 118 transmits the light-source heat-dissipating-direction data to the controller 120, the light-source heat-dissipating-direction data indicating that the light-source heat dissipating directions are the horizontal direction or the upper direction. At this time, the controller 120 determines that the orientation of the projection-type image display apparatus 100 is the predetermined orientation on the basis of the light-source heat-dissipating-direction data received from the light-source heat-dissipating-direction detector 118.

On the other hand, for example, when the positive side of the projection-type image display apparatus 100 in the Y axis is placed on the floor when being used as shown in FIG. 6 (c), the light-source heat-dissipating-direction detector 118 transmits the light-source heat-dissipating-direction data indicating that the light-source heat dissipating directions are the lower direction, to the controller 120. At this time, the controller 120 may determine that the orientation of the projection-type image display apparatus 100 is not the predetermined orientation on the basis of the light-source heat-dissipating-direction data received from the light-source heat-dissipating-direction detector 118, and the controller 120 may control the display-element driver 103 to form an image notifying the user of a message on the display element 102. Examples of the message include, for example, a message indicating that the projection-type image display apparatus 100 with a better performance is usable in the orientation of the example of FIG. 6 (b) than the orientation of the example of FIG. 6 (c) even if the orientations are similarly based on the vertical display mode. This manner can encourage the user to apply how to use the projection-type image display apparatus 100 with the better performance.

The light-source heat-dissipating-direction detector 118 may be formed of, for example, an orientation sensor such as a gravity sensor. By such a configuration, for example, the orientation of the projection-type image display apparatus 100 placed can be detected by the light-source heat-dissipating-direction detector 118, and the light-source heat dissipating directions can be detected as a result of comparison with positional information of components in the apparatus.

In such a way that, for example, a table for retaining a relation between the light-source heat-dissipating-direction data and angular information that is a detection result of the orientation sensor such as the gravity sensor is stored in the non-volatile memory 116, the light-source heat-dissipating-direction data can be acquired from the detection result of the orientation sensor such as the gravity sensor. Alternatively, for example, even if the projection-type image display apparatus 100 does not retain the light-source heat-dissipating-direction data, in such a way that a threshold of the angular information of the detection result of the orientation sensor such as the gravity sensor for switching each process for the detection result of the light-source heat dissipating direction described above in each embodiment is previously set as a value corresponding to the switching of the light-source heat dissipating directions, a simple processing that compares the threshold and the detection result of the orientation sensor such as the gravity sensor is practically equivalent to a processing that detects the light-source heat dissipating directions.

As the image formed on the display element 102, images can be cited, such as a content display image indicating that the projection-type image display apparatus 100 is reversely placed or a content display image indicating that the backward placement causes the brighter display.

In addition to this, for example, these contents may be displayed on a sub display screen, the audio output unit 111 may notify the user of the contents through voice sound or alert sound.

According to such a configuration, when the horizontal display mode and the vertical display mode are switched in the usage, the orientation of the projection-type image display apparatus 100 can be determined by the apparatus itself. When the orientation is not the predetermined orientation, the apparatus gives a predetermined warning to the user, so that misusage of the projection-type image display apparatus 100 can be suppressed.

In the foregoing, the invention made by the present inventors has been concretely described on the basis of the embodiments. However, it is needless to say that the present invention is not limited to the foregoing embodiments, and various modifications can be made within the scope of the present invention. For example, the above-described embodiments have been explained in detail for easily understanding the present invention, and are not always limited to the ones including all structures explained above. Further, another structure can be added to/eliminated from/replaced with a part of the structure of each of the embodiments.

EXPLANATION OF REFERENCE CHARACTERS 100, 200 . . . projection-type image display apparatus, 102 . . . display element, 106R, 106G and 106B . . . light source, 108 . . . power source, 110R, 110G and 110B . . . light-source cooler, 118 . . . light-source heat-dissipating-direction detector, 120 . . . controller, 130R, 130G, 131G and 130B . . . heat-dissipation accelerating member, 150 . . . display-element cooler, 190 . . . housing, 260R, 260G and 261G . . . cooling fan

The invention claimed is:

1. A projection-type image display apparatus that projects images formed on a display element, the projection-type image display apparatus comprising:
a plurality of light sources;
light-source coolers configured to cool the plurality of light sources, respectively, wherein the light-source coolers are arranged so that light-source heat dissipating directions of all the light-source coolers are substantially the same as one another, the light-source heat dissipating directions being directions toward heat dissipating parts dissipating heat of the light sources with reference to heat absorbing parts absorbing the heat of the plurality of light sources; and
a display-element cooler configured to cool the display element, wherein the display-element cooler is arranged so that a display-element heat dissipating direction of the display-element cooler is substantially the same as the light-source heat dissipating direction of each of the light-source coolers, the display-element heat dissipating direction being a direction toward a heat dissipating part dissipating heat of the display element with reference to a heat absorbing part absorbing the heat of the display element.

2. The projection-type image display apparatus according to claim 1, wherein each of the light-source coolers is formed of a heat pipe.

3. The projection-type image display apparatus according to claim 1, wherein at least any one or more of the light sources includes a plurality of the light-source coolers.

4. The projection-type image display apparatus according to claim 1, wherein a heat-dissipation accelerating member configured to accelerate heat dissipation from the heat dissipating part is provided to the heat dissipating part of each of the light-source coolers.

5. The projection-type image display apparatus according to claim 4, wherein the heat-dissipation accelerating member is formed of a heat dissipating fin.

6. The projection-type image display apparatus according to claim 1, further comprising:
a cooling fan configured to accelerate heat dissipation from the heat dissipating part of each of the light-source coolers,
wherein the heat dissipating part is arranged in a flow path of cooling air transmitted from the cooling fan.

7. The projection-type image display apparatus according to claim 1, wherein the display-element cooler is formed of a heat pipe.

8. The projection-type image display apparatus according to claim 1, wherein the display-element cooler is formed of a heatsink.

9. The projection-type image display apparatus according to claim 1,
wherein the projection-type image display apparatus has a plurality of operating modes that each correspond to a different orientation of the projection-type image display apparatus,
wherein in a first mode of the plurality of operating modes, the projection-type image display apparatus projects the image by setting a short-side direction of the image formed on the display element as a longitudinal direction of the projected image and setting a long-side direction of the image formed on the display element as a lateral direction of the projected image, and
wherein in a second mode of the plurality of operating modes, the projection-type image display apparatus projects the image by setting the long-side direction of the image formed on the display element as the longitudinal direction of the projected image and setting the short-side direction of the image formed on the display element as the lateral direction of the projected image,
wherein in both of the first mode and the second mode, the light-source coolers are arranged so that the light-source heat dissipating directions are a horizontal direction or more upward than the horizontal direction.

10. The projection-type image display apparatus according to claim 9, further comprising:
a light-source heat-dissipating-direction detector configured to detect each of the light-source heat dissipating directions of the light-source coolers; and
a controller configured to control the projection-type image display apparatus,
wherein, on a condition an orientation of the projection-type image display apparatus is changed from one of orientations of the first mode or the second mode to another orientation, the controller reduces light amounts of the plurality of light sources when the light-source heat-dissipating-direction detector detects that the light-source heat dissipating directions are more downward than the horizontal direction.

11. The projection-type image display apparatus according to claim 9, further comprising:
a light-source heat-dissipating-direction detector configured to detect each of the light-source heat dissipating directions of the light-source coolers;
a cooling fan configured to accelerate heat dissipation from the heat dissipating part of each of the light-source coolers; and
a controller configured to control the projection-type image display apparatus,
wherein, on a condition an orientation of the projection-type image display apparatus is changed from one of orientations of the first mode or the second mode to another orientation, the controller increases a rotation speed of the cooling fan when the light-source heat-dissipating-direction detector detects that the light-source heat dissipating directions are more downward than the horizontal direction.

12. The projection-type image display apparatus according to claim 9, further comprising:
a light-source heat-dissipating-direction detector configured to detect each of the light-source heat dissipating directions of the light-source coolers; and
a controller configured to control the projection-type image display apparatus,
wherein, on a condition that an orientation of the projection-type image display apparatus is changed from one of orientations of the first mode or the second mode to another orientation, the controller forms an image on the display element that indicates that the orientation of the projection-type image display apparatus is different from a predetermined orientation when the light-source heat-dissipating-direction detector detects that the light-source heat dissipating directions are more downward than the horizontal direction.

13. The projection-type image display apparatus according to claim 10, wherein the light-source heat-dissipating-direction detector is formed of a gravity sensor.

* * * * *